United States Patent
Gold et al.

(10) Patent No.: US 8,174,266 B2
(45) Date of Patent: May 8, 2012

(54) MULTI-RESOLUTION BOREHOLE RESISTIVITY IMAGING

(75) Inventors: Randy Gold, Houston, TX (US); Alexandre N. Bespalov, Spring, TX (US); Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 768 days.

(21) Appl. No.: 12/178,306

(22) Filed: Jul. 23, 2008

(65) Prior Publication Data

US 2010/0019771 A1    Jan. 28, 2010

(51) Int. Cl.
G01V 3/02 (2006.01)
G01V 3/18 (2006.01)

(52) U.S. Cl. .................. 324/355; 324/323; 324/331

(58) Field of Classification Search .................. None
See application file for complete search history.

(56) References Cited

U.S. PATENT DOCUMENTS

| | | | |
|---|---|---|---|
| 4,468,623 A | 8/1984 | Gianzero et al. | |
| 4,692,908 A | 9/1987 | Ekstrom et al. | |
| 5,502,686 A | 3/1996 | Dory et al. | |
| 5,677,631 A | 10/1997 | Reittinger et al. | |
| 6,220,371 B1 | 4/2001 | Sharma et al. | |
| 6,600,321 B2 | 7/2003 | Evans | |
| 6,714,014 B2 | 3/2004 | Evans et al. | |
| 6,803,039 B2 | 10/2004 | Tsuji et al. | |
| 6,809,521 B2 | 10/2004 | Tabarovsky et al. | |
| 7,250,768 B2 | 7/2007 | Ritter et al. | |
| 2002/0153897 A1 | 10/2002 | Evans et al. | |
| 2004/0104726 A1* | 6/2004 | Chemali et al. | 324/369 |
| 2006/0103388 A1 | 5/2006 | Forgang et al. | |
| 2007/0035306 A1* | 2/2007 | Forgang et al. | 324/358 |
| 2007/0216417 A1* | 9/2007 | Ritter et al. | 324/367 |
| 2008/0252296 A1 | 10/2008 | Hu et al. | |
| 2010/0007348 A1* | 1/2010 | Fang et al. | 324/339 |
| 2010/0039115 A1* | 2/2010 | Bespalov et al. | 324/355 |

* cited by examiner

*Primary Examiner* — Jermele M Hollington
*Assistant Examiner* — Trung Nguyen
(74) *Attorney, Agent, or Firm* — Mossman, Kumar & Tyler, PC

(57) ABSTRACT

An apparatus, method and computer-readable medium for obtaining a resistivity image of an earth formation. The apparatus includes a downhole assembly configured to be conveyed in a borehole penetrating the earth formation; a plurality of sensor electrodes on the downhole assembly, each of the plurality of sensor electrodes having a different capacitance to a wall of the borehole; and at least one processor configured to: (i) process measurements using each of the sensor electrodes; (ii) process a subset of the measurements substantially unaffected by the different capacitances to produce an image of the borehole wall; and (iii) record the image on a suitable medium.

16 Claims, 8 Drawing Sheets

MULTI-RESOLUTION BOREHOLE RESISTIVITY IMAGING

BACKGROUND OF THE DISCLOSURE

1. Field of the Disclosure

The present disclosure is related to resistivity imaging of an earth formation penetrated by a borehole. In particular, the present disclosure is an apparatus and a method for imaging electrical properties of a formation at multiple resolution scales.

2. Background of the Art

Typically, borehole resistivity can be imaged using resistivity imaging devices conveyed downhole, for example, on a drill string. In one type of resistivity imaging device, such as is typically used in boreholes with conductive mud, one or more electrodes are used to emit current into a formation. A measurement of the amount of current emitted reflects a conductivity of the formation in front of the electrode. In such an imaging device, the resolution is proportional to the size of measure electrodes used. Large measure electrodes cover a large area and correspond to a low resolution scale, and small electrodes cover a small area and correspond to a high resolution scale. In another type of resistivity imaging, such as non-conductive mud imaging, typically a four-terminal device is used which includes an injection electrode and a return electrode for injecting current into a formation and at least two sensor electrodes to measure a potential gradient between the injection and return electrodes. For such a device, the image resolution is proportional to the spacing between the sensor electrodes. A large distance between sensor electrodes corresponds to a low resolution scale, and a short distance between sensor electrodes corresponds to a high resolution scale.

When designing resistivity imaging devices, two competing factors, image resolution and stability, must be considered. Stability is related to the signal-to-noise ratio of an image response. Generally, an electrode designed for high resolution suffers from a low signal-to-noise ratio and thus provides a less stable signal. Inversely, an electrode designed for low resolution has a high signal-to-noise ratio and thus provides a more stable signal. In order to design a resistivity imaging device, a balance is generally struck between stability concerns and resolution requirements.

Existing borehole resistivity imaging devices are designed to have a fixed resolution. However, in typical imaging, there is often a need to obtain resistivity images at a plurality of resolution scales. The present disclosure addresses this need.

SUMMARY OF THE DISCLOSURE

The present disclosure provides an apparatus for obtaining a resistivity image of an earth formation. The apparatus includes a downhole assembly configured to be conveyed in a borehole penetrating the earth formation; a plurality of sensor electrodes on the downhole assembly, each of the plurality of sensor electrodes having a different capacitance to a wall of the borehole; and at least one processor configured to: (i) process measurements using each of the sensor electrodes; (ii) process a subset of the measurements substantially unaffected by the different capacitances to produce an image of the borehole wall; and (iii) record the image on a suitable medium. The at least one processor may be further configured to select the subset of the measurements by comparing a measurement made by an electrode to a measurement made by a reference electrode having a specified size.

In one aspect, a first one of the plurality of sensor electrodes has a different extent in at least one of: (I) a first direction substantially parallel to a longitudinal axis of the downhole assembly, and (II) a second direction substantially orthogonal to the longitudinal axis of the downhole assembly than an extent of a second of the plurality of sensor electrodes in at least one of: (I) the first direction, and (II) the second direction; and the at least one processor is further configured to process the measurements by: (A) determining a first resistivity of the earth formation using at least one of: (I) a current in the first electrode, and (II) a voltage of the first electrode; and (B) determining a second resistivity of the earth formation using at least one of: (I) a current in the second electrode, and (II) a voltage of the second electrode. The extent of the first sensor electrode may correspond to a first resolution scale and the extent of the second sensor electrode may correspond to a second resolution scale different from the first resolution scale.

In one aspect, the first electrode and the second electrode may be selected from: (i) a first current electrode and a second current electrode, and (ii) a first pair of potential electrodes and a second pair of potential electrodes. Wherein the first electrode and the second electrode are selected from the first pair of potential electrodes and the second pair of potential electrodes, the apparatus further may include an injection electrode configured to inject current into the formation and a return electrode configured to receive return current, the injection electrode and the return electrode disposed at locations on opposite sides of the first and second pairs of potential electrodes.

In another aspect, the plurality of sensor electrodes is arranged in a two-dimensional array. In yet another aspect, at least one of the first one of the sensor electrodes and the second one of the sensor electrodes includes a grouping of more than one of the plurality of sensor electrodes. The electrodes may be grouped using one of: i) a digital selection process, and ii) an analog selection process.

The present invention also provides a method of obtaining a resistivity image of an earth formation, which includes: conveying a downhole assembly in a borehole penetrating the earth formation, the downhole assembly including a plurality of sensor electrodes each having a different capacitance to a wall of the borehole; processing measurements obtained using each of the sensor electrodes; processing a subset of the measurements substantially unaffected by the different capacitances to produce an image of the borehole wall; and recording the image on a suitable medium. Processing the subset of the measurements may include comparing a measurement made by an electrode to a measurement made by a reference electrode having a specified size.

In one aspect a first one of the plurality of sensor electrodes may have a different extent in at least one of: (I) a first direction substantially parallel to a longitudinal axis of the downhole assembly, and (II) a second direction substantially orthogonal to the longitudinal axis of the downhole assembly than an extent of a second of the plurality of sensor electrodes in at least one of: (I) the first direction, and (II) the second direction; wherein processing the measurements further includes: (A) determining a first resistivity of the earth formation using at least one of: (I) a current in the first electrode, and (II) a voltage of the first electrode; and (B) determining a second resistivity of the earth formation using at least one of: (I) a current in the second electrode, and (II) a voltage of the second electrode. The extent of the first sensor electrode corresponds to a first resolution scale and the extent of the second sensor electrode corresponds to a second resolution scale different from the first resolution scale.

In one aspect, the first electrode and the second electrode may be selected from: (i) a first current electrode and a second current electrode, and (ii) a first pair of potential electrodes and a second pair of potential electrodes. Wherein selecting the first electrode and the second electrode from the first pair of potential electrodes and the second pair of potential electrodes, current may be injected into the formation using an injection electrode and received from the formation at a return electrode, the injection electrode and the return electrode disposed at locations on opposite sides of the first and second pairs of current electrodes.

In another aspect, the plurality of sensor electrodes may be arranged in a two-dimensional array. In yet another aspect, more than one of the plurality of sensor electrodes may be grouped to obtain at least one of the first sensor electrode and the second sensor electrode. The sensor electrodes may be grouped either digitally or analogically.

The present disclosure also provides a computer-readable medium for use with a tool for obtaining a resistivity image of an earth formation. The tool includes a downhole assembly configured to be conveyed in a borehole penetrating the earth formation, and a plurality of sensor electrodes on the downhole assembly, each of the plurality of sensor electrodes having a different capacitance to a wall of the borehole. The medium includes instructions which enable a processor to: (a) process measurements using each of the sensor electrodes; (b) process a subset of the measurements substantially unaffected by the different capacitances to produce an image of the borehole wall; and (c) record the image on a suitable medium. The medium may include at least one of: (i) a ROM, (ii) and EPROM, (iii) an EEPROM, (iv) a flash memory, and (v) an optical disk.

BRIEF DESCRIPTION OF THE FIGURES

The present disclosure is best understood with reference to the accompanying figures in which like numerals refer to like elements and in which.

DETAILED DESCRIPTION OF THE DISCLOSURE

Figure 1:
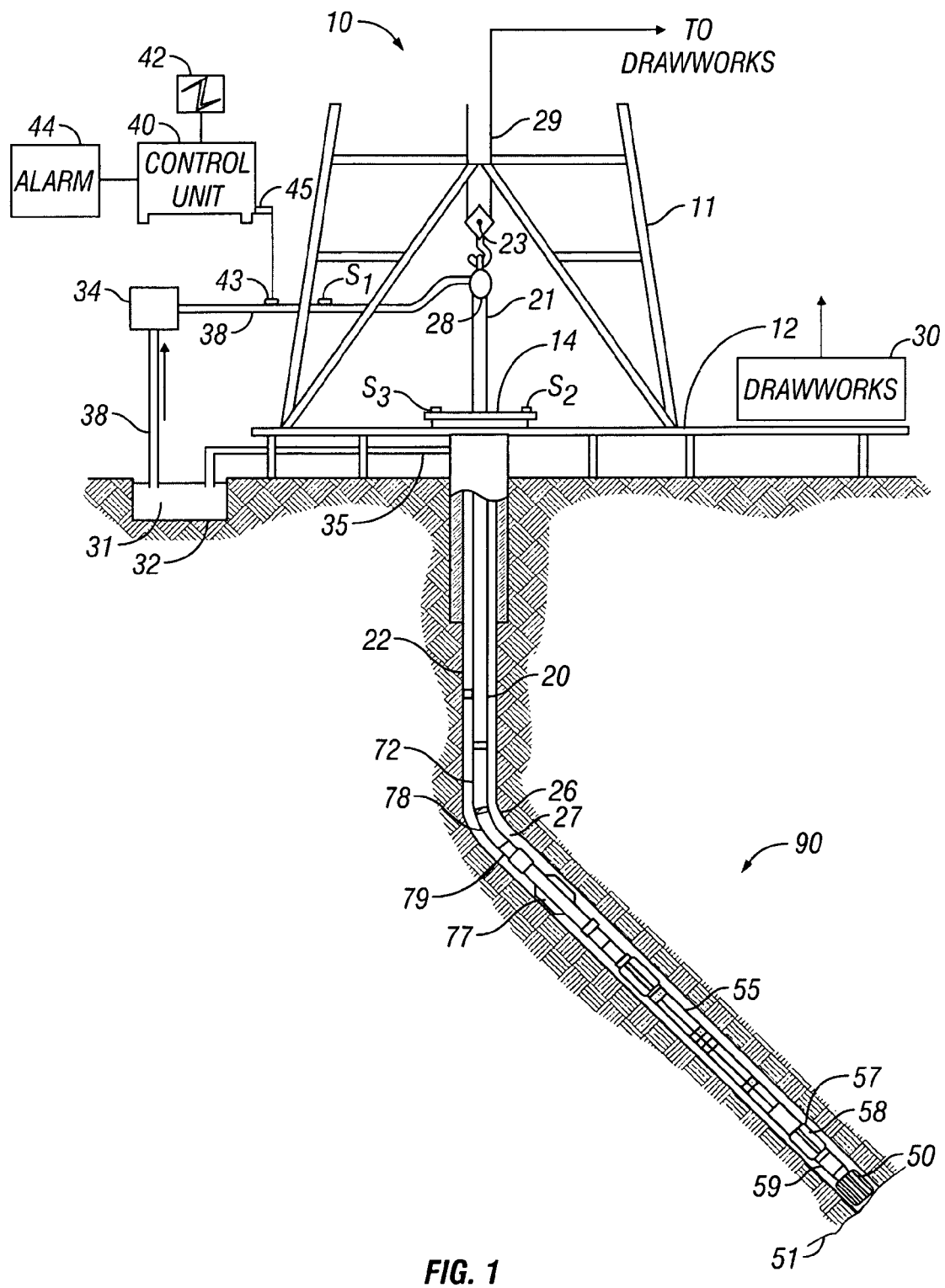
FIG. 1 (Prior Art) shows a schematic diagram of a drilling system with a drillstring carrying a drilling assembly in a wellbore.

The method of the present disclosure may be implemented on a wireline conveyed logging string or on a bottomhole assembly (BHA) conveyed on a drilling tubular. For purposes of illustration only, an embodiment on a BHA conveyed on a drilling tubular is discussed. This is not to be construed as a limitation. FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In the exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the communication sub 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 generally includes a computer or a microprocessor-based processing system, memory for storing programs or models and data, a recorder for recording data, and other peripherals. The control unit 40 is typically adapted to activate alarms 44 when certain unsafe or undesirable operating conditions occur.

FIGS. 2-4 and 6-9 show exemplary configurations of electrodes that may be conveyed downhole to obtain borehole resistivity images. FIGS. 2A-B show exemplary electrode configurations for acquiring images at multiple resolutions. In FIGS. 2A-B, the vertical direction indicates an axial (vertical) direction along the logging tool and the horizontal direction indicates an azimuthal direction of the logging tool. FIG. 2A shows a plurality of electrodes 201-209, each electrode having an azimuthal dimension corresponding to a selected resolution scale. For example, electrode 201 has the shortest azimuthal length of the plurality of electrodes 201-209 and thus has the highest azimuthal resolution of the plurality of electrodes. Electrode 209 has the longest azimuthal length of the plurality of electrodes 201-209 and thus has the lowest azimuthal resolution of the plurality of electrodes. Electrodes 201-209 are progressively sized to separate resolution scales in the azimuthal direction. This electrode configuration of FIG. 2A yields images of various resolutions in the azimuthal direction but maintains the same resolution in the vertical direction.

Figure 2A:
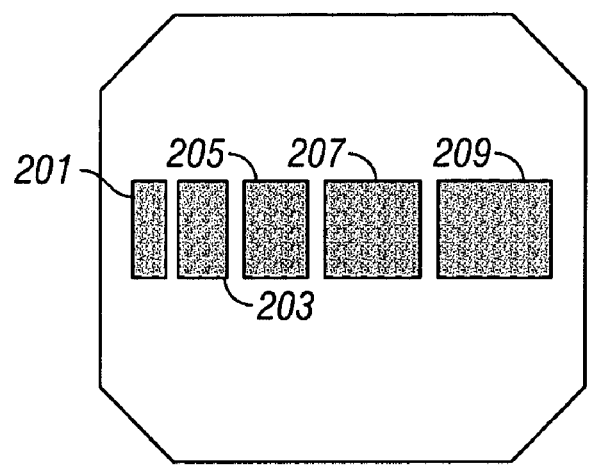
FIGS. 2A-B show exemplary electrode configurations for acquiring images at multiple resolutions.
Figure 2B:
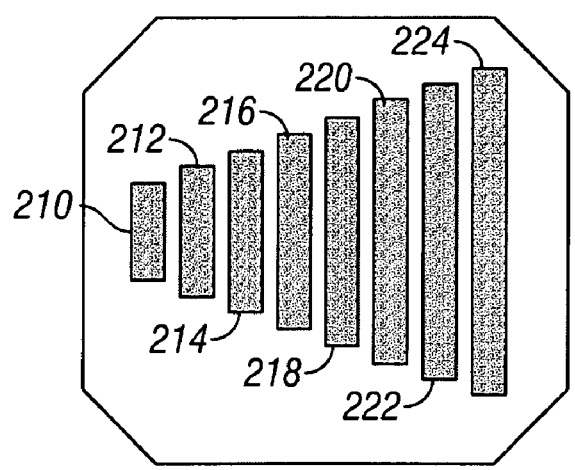

FIG. 2B shows multiple electrodes 210-224, each electrode having a vertical dimension corresponding to a selected resolution scale. For example, electrode 210 has the shortest vertical height of the plurality of electrodes 210-224 and thus has the highest vertical resolution of the plurality of electrodes. Electrode 224 has the longest vertical height of the plurality of electrodes 210-224 and thus has the lowest vertical resolution of the electrodes 210-224. Electrodes 210-224 are progressively sized to separate resolution scales in the vertical direction. The configuration of FIG. 2B yields images at a plurality of resolutions in the vertical direction but maintains the resolution in the azimuthal direction.

Figure 3:
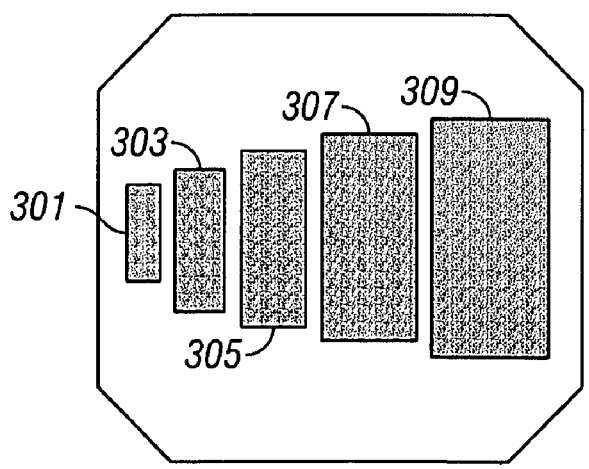
FIG. 3 shows an exemplary electrode configuration for obtaining images at multiple resolutions.

FIG. 3 shows an exemplary electrode configuration for obtaining images at multiple azimuthal and vertical resolutions. In the embodiment of FIG. 3, each electrode of the plurality of electrodes 301-309 has an azimuthal length and vertical height selected to correspond to a resolution scale. Electrode 301, for example, has the smallest azimuthal length and the shortest vertical height of the plurality of electrodes 301-309. Electrode 301 thus has the highest resolution of the plurality of electrodes in both the azimuthal and vertical directions. Electrode 309 has the longest azimuthal length and the longest vertical height of the plurality of electrodes 301-309. Electrode 309 thus has the lowest resolution of the plurality of electrodes in both the azimuthal and vertical directions. Electrodes 301-309 are progressively sized in the azimuthal and vertical directions to separate resolution scales.

Figure 4:
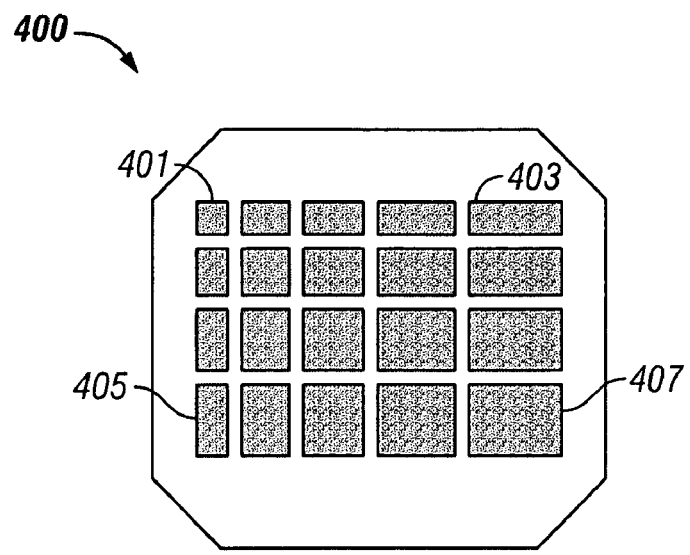
FIG. 4 shows an embodiment in which electrodes are arranged in a two-dimensional array.

FIG. 4 shows an embodiment in which electrodes of varying resolution scales are arranged in a two-dimensional array 400. The dimension of an electrode in general corresponds to its position in the array. Electrodes in the same row have the same height and different azimuthal lengths. Electrodes in the same column have the same azimuthal length but different heights. Electrode 401 has the shortest azimuthal and vertical dimensions. Electrode 403, in the same row as electrode 401, has the same vertical dimension as electrode 401 but has a larger azimuthal length. Electrode 405, in the same column as electrode 401, has the same azimuthal length as electrode 401 but has a larger vertical length. Electrode 407, diagonally opposite electrode 401, has both the largest azimuthal length and the tallest vertical length. Thus, the array 400 of FIG. 4 includes electrodes that may be selected so as to obtain images with a resolution that can be vertically varying and azimuthally fixed resolution; vertically fixed and azimuthally varying resolution; or any combination of vertically varying and azimuthally varying.

Figure 5:
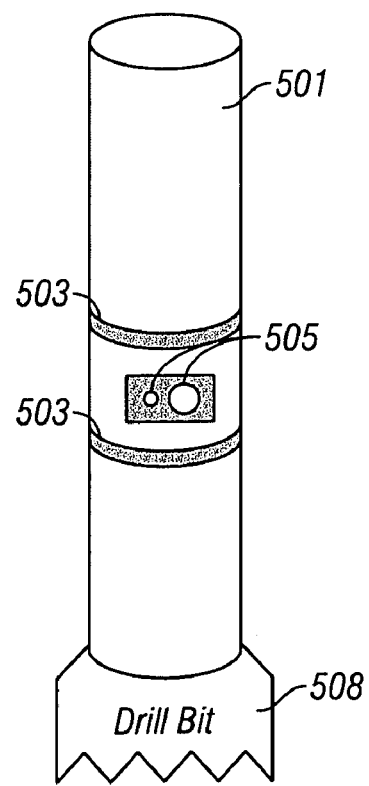
FIG. 5 shows an exemplary embodiment of a logging-while-drilling tool with multiple electrodes on a rotating drilling string.

FIG. 5 shows an exemplary embodiment of a logging-while-drilling (LWD) tool with multiple electrodes on a rotating drilling string. Electrodes 505 are situated on the outer diameter of a drill string 501 having a drill bit 508. Current is emitted from the sensor electrodes and returned to transmitter electrodes (not shown) elsewhere on the drill string. Insulators 503 are disposed on either axial side of the electrodes 505 to provide electrical insulation between electrodes 505 and transmitter electrodes. Multi-resolution imaging disclosed above is equally applicable to LWD applications. Installing multiple sensor electrodes on a rotating drilling string enables an operator to obtain images at multiple resolutions. The electrode arrangement of FIG. 5 is one of many possible embodiments and is only shown for the illustration purposes.

Figure 6:
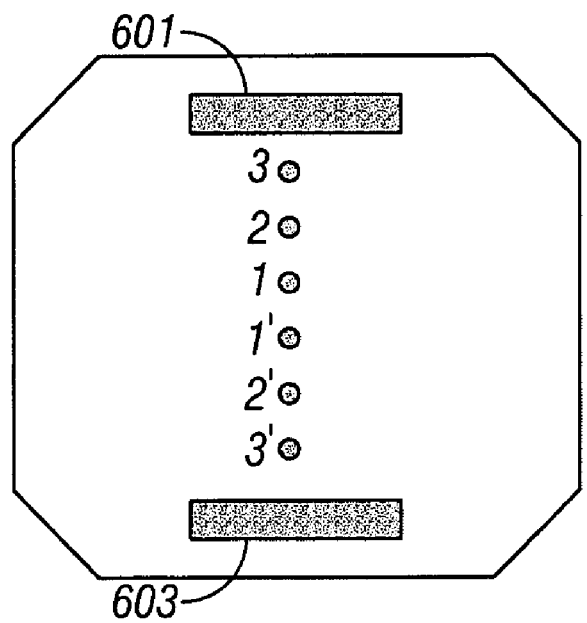
FIGS. 6-7 show exemplary embodiments of an imaging device employing a four-terminal method of resistivity imaging.
Figure 7:
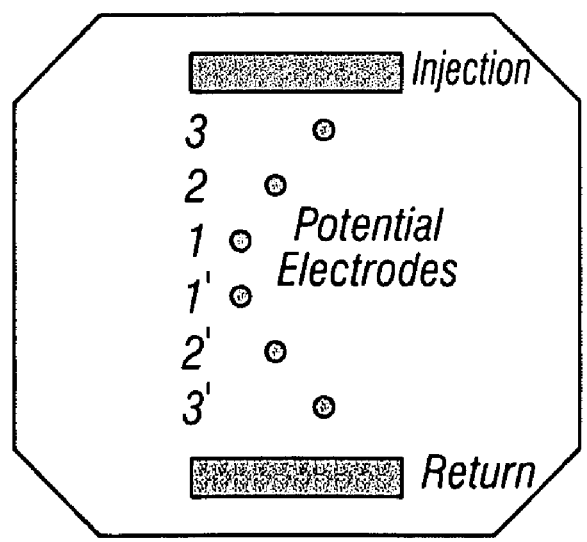

FIG. 6 shows an exemplary embodiment of an imaging device of the present disclosure employing a four-terminal method of resistivity imaging. The device of FIG. 6 includes multiple pairs of potential electrodes placed in between an injection electrode 601 and a return electrode 603 to measure a potential gradient at one or more spacings. Each pair of potential electrodes may be referred to as a sensor electrode. Three electrode pairs are shown: 1-1', 2-2', and 3-3'. The electrode pairs have different spacings, thereby enabling one to acquire images at various resolution scales. For the imaging devices of FIG. 6, the resolution is determined by the spacing between the potential electrodes. Increasing the spacing of the potential electrodes leads to lowering the image resolution. Because there is no requirement that each of the electrode pairs are in line with each other, it is possible to azimuthally stagger the electrode pairs. This alternate configuration is shown in FIG. 7.

Figure 8:
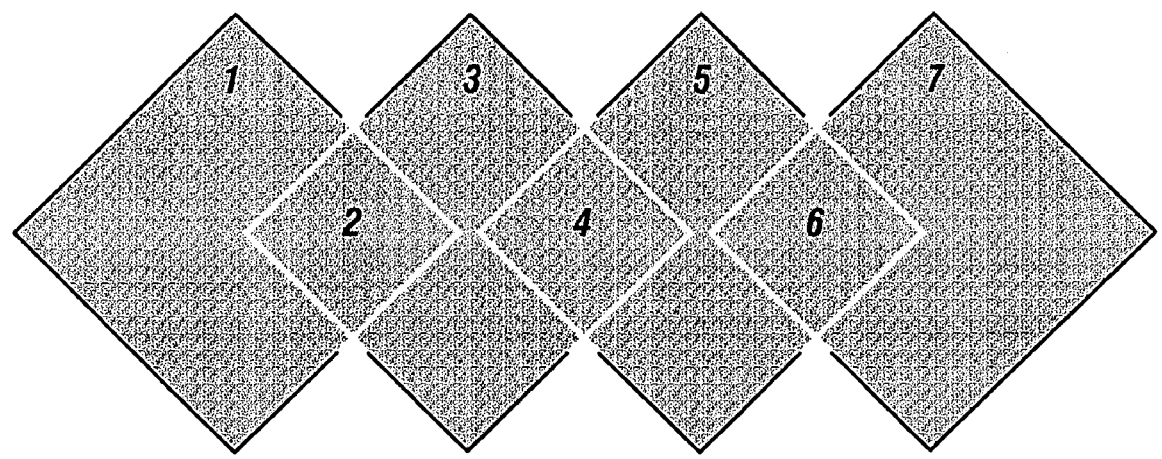
FIG. 8 shows electrodes which may be grouped so as to obtain images at multiple resolution scales.

FIG. 8 shows electrodes 800 which may be grouped so as to obtain images at multiple resolution scales. In the illustration of FIG. 8, higher resolution images are obtained using the small electrodes 2, 4, and 6. The electrodes may also be used in combination with each other, for instance, by grouping several smaller electrodes to operate together as a larger electrode unit. For instance, electrodes 1-7 may be grouped into four groups as follows: 1-2, 2-3-4, 4-5-6, and 6-7. This grouping method creates four electrodes having a larger surface area (compared to electrodes 2, 4 and 6 used alone). Lower resolution images are subsequently generated. The electrodes may be grouped using either digital or analogical methods. It is noted that in FIG. 8 the larger electrodes may be virtually overlapped but without physical touching each other. This is an advantage of the configurable electrodes of FIG. 8, since overlapping electrodes reduce the sampling interval.

Figure 9:
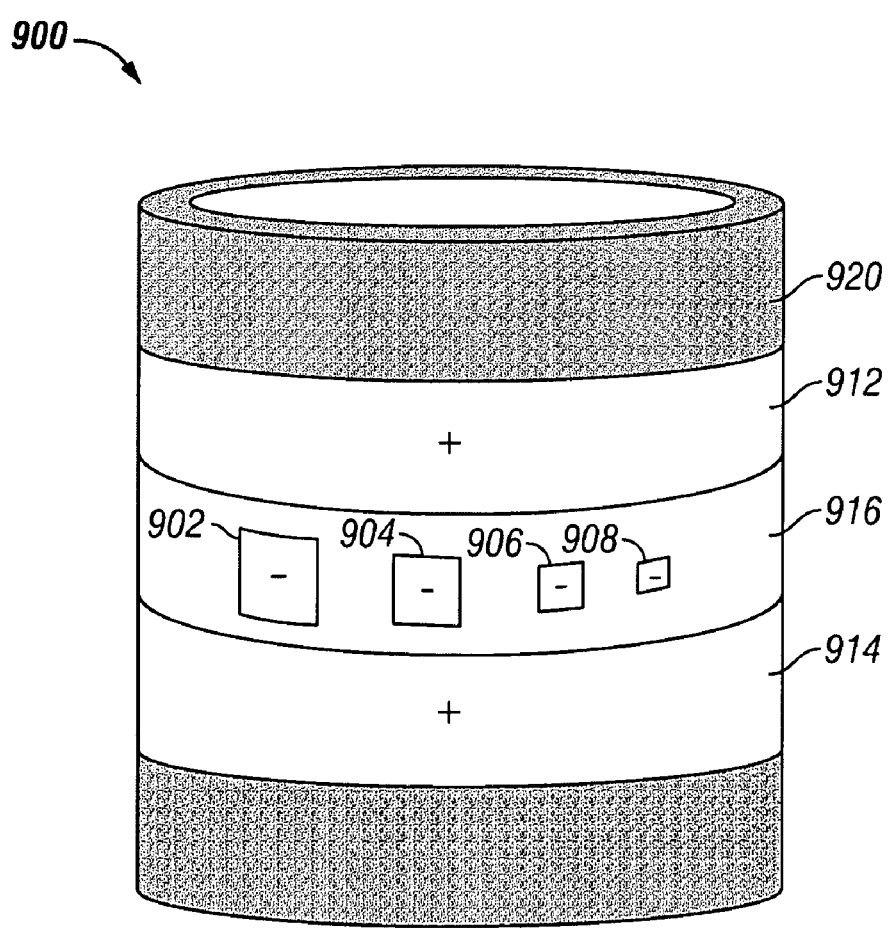
FIG. 9 shows an embodiment of the present disclosure including a series of sensor electrodes placed on a single circumferential pad attached to the drill.

Another embodiment of the disclosure uses the principles discussed above for imaging borehole wall resistivity with 360° coverage in the presence of oil-based mud and variable standoff. An exemplary imager contains a circumferential pad mounted on a rotating drill and a series of variable size sensor electrodes separated by insulating gaps and is shown in FIG. 9. An AC voltage source between the symmetrical transmitting electrodes and sensor electrodes is used to provide sufficient conditions for injecting current into the formation. In one aspect, the pad is mounted on a rotating drill which provides 360° coverage. The 360° coverage is achieved via a combination of the pad's shape, pad's azimuthal rotation, and a system to centralize the position of the imager in the well. The sensor is generally maintained at the center of the borehole during drilling by, for example, using a stabilizer.

FIG. 9 shows an exemplary embodiment 900 of the present disclosure including a series of sensor electrodes 902, 904, 906, and 908 placed on a single circumferential pad 916 attached to the drill 920. The sensor electrodes have different sizes and are separated by isolating gaps. A source voltage of high frequency (1 MHz or above) is applied between a symmetrical set of return electrodes (transmitters 912, 914) and electrodes 902, 904, 906, and 908. All of the sensor electrodes are kept electrically under the same potential driven by the applied voltage. A measured value at a selected sensor electrode represents the complex impedance measured through each sensor electrode. The exemplary embodiment of FIG. 9 provides capacitive coupling between each sensing electrode and the formation and enables imaging of the formation even in the presence of a very resistive oil-based mud.

The plurality of the sensor electrodes of different size provides enough flexibility to adjust an image for the variable standoff conditions by correcting for the variable standoff and to select readings suitable for the determined standoff. An estimate of the gap width (standoff) between each sensor electrode and the borehole wall may be obtained from measurements obtained using at least two different sizes of sensor electrodes. The estimated standoff value may then be used to correct measurements for the effects of the standoff. Measurements may be selected from appropriate sensors to maintain acceptable vertical resolution under the variable standoff conditions.

The main challenge for adjusting measurements to the variable borehole conditions is finding a means to estimate the standoff between the pad and the borehole wall. The method of the present disclosure, in one aspect, estimates the standoff by performing measurements using sensor electrodes of different sizes. A geometric factor concept is introduced according to the formula:

$$G \cdot Re(\dot{Z}) = R_f \quad (1),$$

where $Re(\dot{Z})$ is the real part of a measured impedance, $R_f$ is a resistivity of the formation, and G is a geometric factor.

Figure 10:
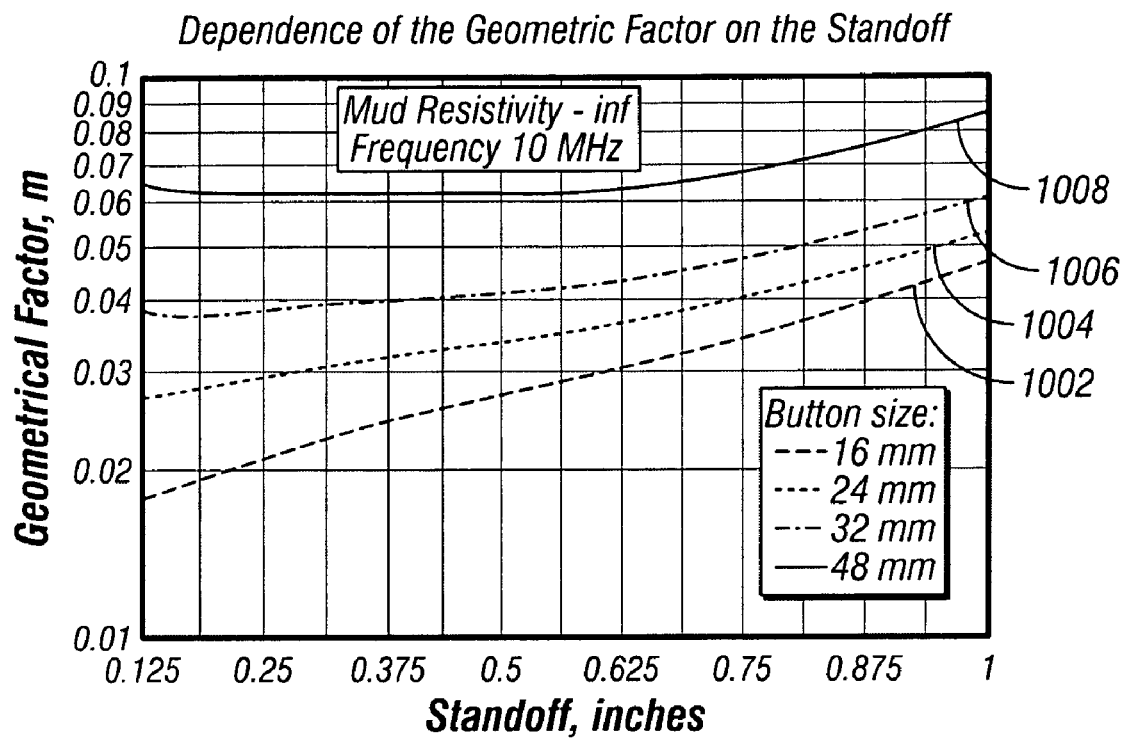
FIG. 10 illustrates mathematical modeling of a dependence of a geometric factor on standoff for various electrode sizes.

Even in the presence of perfectly resistive mud, the geometric factor G changes with the standoff. The change becomes more pronounced when small sensor electrodes are used in a situation with a big standoff. FIG. 10 illustrates mathematical modeling results of the dependence of geometric factor G on standoff. For the exemplary modeling results of FIG. 10, geometric factors are obtained for electrode sizes of 16 mm (1002), 24 mm (1004), 32 mm (1006) and 48 mm (1008) used in a homogeneous formation having a resistivity of 10 ohm-m. The operating frequency is 10 MHz, and the distance from the center of each sensor electrode and the return electrode is 96 mm. As seen from FIG. 10, the geometric factor of a large electrode (i.e., 48 mm sensor electrode 1008) is generally independent of the standoff when the standoff is less than 0.625 in. The geometric factors of smaller electrodes, such as 16 mm electrode (1002), 24 mm electrode (1004) and 32 mm electrode (1004) generally depend on the standoff over the entire analyzed range of standoffs from 0.125 inches to 1 inch.

Figure 11:
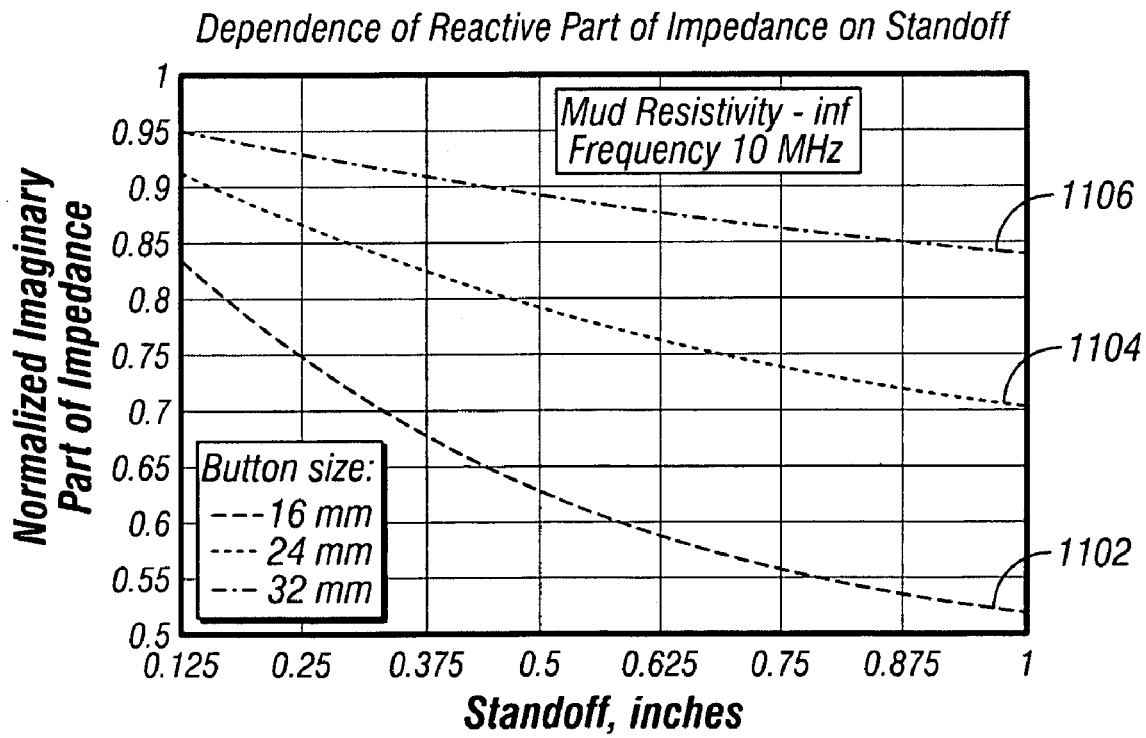
FIG. 11 illustrates a dependence of a reactive part of a measurement on a standoff value.

FIG. 11 shows a dependence of a reactive part of measured impedance on a standoff value. Curves 1102, 1104 and 1106 are normalized curves representing a ratio of measurements obtained from a 16 mm electrode (1102), a 24 mm electrode (1104) and a 32 mm electrode (1106) at a given standoff against a measurement obtained from a 48 mm electrode obtained at the same standoff. As seen in FIG. 11, the dependence of the normalized imaginary part of the impedance varies with the standoff depending on the size of the sensor. At a small standoff, such as a standoff of 0.125 inches, there is a relatively small difference between impedances measured using different electrode sizes. At larger standoffs, such as 0.5 inches of standoff, there is a significant difference between impedances measured using different electrode sizes. In order to perform the correction for standoff, an operator obtains impedance measurements at a selected sensor electrode and at the 48 mm sensor electrode and calculates a ratio between the two measurements. This calculation may also be performed, for example, by a processor or by appropriate circuitry configured to perform the calculation. Then, for the given size of the selected sensor electrode (corresponding to a selected curve of FIG. 11) and the calculated ratio (a value along the y-axis in FIG. 11), the chart from FIG. 11 enables an operator to determine a standoff (a value along the x-axis from FIG. 11). Once a standoff value is determined, the correction chart from FIG. 10 may be used to determine the geometric factor G corresponding to the given sensor electrode size and standoff.

Figure 12:
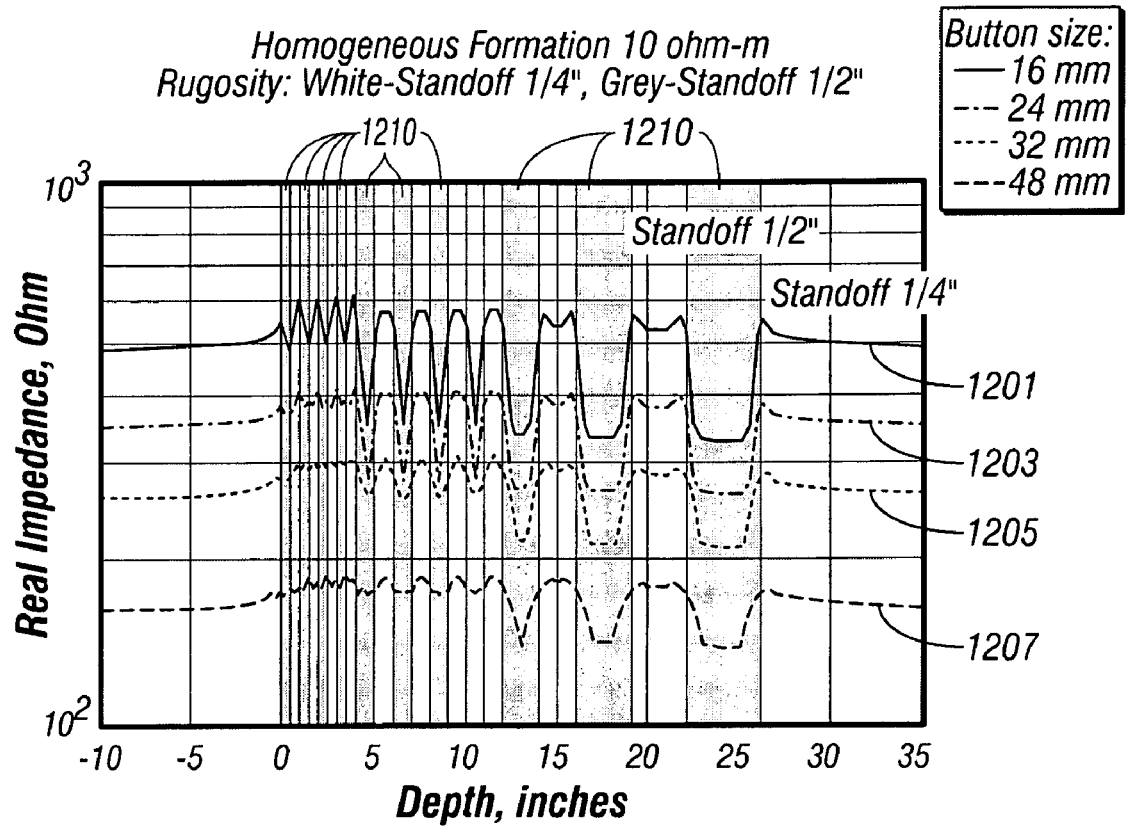
FIG. 12 shows results of measurements obtained from sensor electrodes of different sizes in a rugose borehole penetrating a homogeneous formation.

Finally, measurements may be selected from appropriate sensor sizes to maintain an acceptable vertical resolution under the conditions of variable standoff. In the case of variable standoff, such as may occur in a rugose borehole, the size of the sensor electrode may be selected to obtain an appropriate resolution. As an example, under certain standoff conditions, the measurements from the small sensor electrodes may become non-recoverable due to a low signal-to-noise ratio. Even after being corrected for standoff, the measurements may not deliver an acceptable image of the formation. Under such conditions, measurements may be made using a sensor electrode which is less affected by the standoff than smaller sensor electrodes and which is capable of providing an image of the formation at a suitable resolution scale. Modeled results demonstrate that the acceptable image quality is obtained when the sensor electrode size B is at least three times bigger than the standoff S (B/S≧3). Using this criterion, measurements may be adaptively selected that provide an acceptable image for a given (estimated) standoff. Under conditions of a rugose borehole, this selection is similar to using a low-pass filter, which filters out high frequency components from the data. FIG. 12 presents mathematical modeling results obtained from sensor electrodes of different sizes which are used to image a homogeneous formation from a rugose borehole. Measurements are obtained using sensors with sizes of 16 mm (1201), 24 mm (1203), 32 mm (1205) and 48 mm (1207). Rugosity is simulated by changing the size of the borehole in such a way that the standoff is periodically changing. In the exemplary borehole, the size of the borehole varies between 0.25 inches and 0.5 inches. The amount of standoff varies from 0.5 inches to 4 inches (as indicated by vertical strips 1210 in FIG. 12). As seen from FIG. 12, the measurements obtained using smaller sensor electrodes, such as curve 1201 are highly affected by the borehole irregularities. The measurements obtained using larger sensor electrodes, such as curve 1207, are less affected by the borehole irregularities. Therefore, the larger sensor electrodes are more effective in suppressing measurements of poor quality.

The exemplary charts of FIG. 10 and FIG. 11 are obtained using oil-based mud having a resistivity that is five and more orders of magnitude larger than the resistivity of the formation. Although this is generally valid for many cases, there are some borehole fluids that are less resistive than the surrounding formation. In these cases, a correction for the mud resistivity may additionally be performed. This correction may be based on multi-frequency measurements. Correction for the finite mud resistivity may be performed prior to the geometric factor correction.

Figure 13:
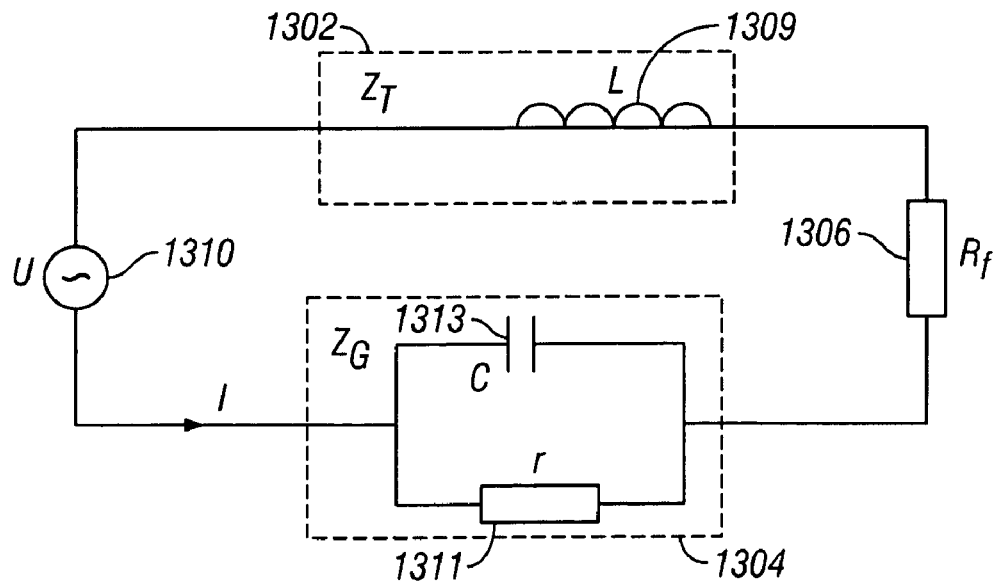
FIG. 13 shows a schematic circuit diagram representing an exemplary circuit through an earth formation for obtaining formation resistivity.

FIG. 13 shows an approximate schematic circuit diagram representing a circuit established through an earth formation when obtaining formation resistivity. The measured effective impedance $Z_e$ depends on the internal impedance of the tool $Z_T$ 1302, the impedance due to the gap between receiver and formation $Z_G$ 1304 and the formation resistivity $R_f$ 1306. For simplicity, the return electrode and the formation are considered to have no gap between them. The internal impedance $Z_T$ of the tool has an inductive component 1309 associated with it. The gap impedance $Z_G$ has both a resistive component 1311 and a capacitive component 1313 and is a function of the size of the sensor electrode and the standoff distance (and the resistivity of the mud filling in the standoff). If U (1310) is the applied voltage and I is the measured current then the measured effective impedance $Z_e$ is $$Z_e = Z_T + Z_G + R_f = \frac{U}{I} \quad (2)$$

In the case of a conductive formation (i.e., ρ<10 ohm-m) and oil-based mud, the contribution of the formation into the effective impedance is comparatively small (e.g., $R_f \ll Z_T + Z_G$), and the measured effective impedance shows a reduced sensitivity to the resistivity of the formation. The gap impedance $Z_G$, which depends on the mud properties and the receiver standoff, then becomes a major contributor to the effective impedance $Z_e$. In order to obtain a measurement of formation resistivity under such conditions, multi-frequency measurements and data processing may be used. Two electronic frequencies $f_1$ and $f_2$ may be used at the electrodes to obtain corresponding effective impedances $Z_{e1}$ and $Z_{e2}$, as shown in Eq. (3):

$$Z_{e1} = i\omega_1 L + R_f + \frac{1}{r^{-1} + i\omega_1 C} = A_1 + iB_1, \quad (3)$$

$$Z_{e2} = i\omega_2 L + R_f + \frac{1}{r^{-1} + i\omega_2 C} = A_2 + iB_2,$$

where $A_1, A_2$ and $B_1, B_2$ correspond to the real and imaginary parts of the impedances $Z_{e1}$ and $Z_{e2}$. Real and imaginary parts of Eqs. (3) may be isolated to obtain:

$$A_1 - A_2 = r^{-1}\left(\frac{1}{r^{-2} + (\omega_1 C)^2} - \frac{1}{r^{-2} + (\omega_2 C)^2}\right), \quad (4)$$

$$\frac{B_1}{\omega_1} - \frac{B_2}{\omega_2} = -C\left(\frac{1}{r^{-2} + (\omega_1 C)^2} - \frac{1}{r^{-2} + (\omega_2 C)^2}\right)$$

A ratio of the isolated real and imaginary parts yields Eq. (5):

$$\frac{\frac{B_1}{\omega_1} - \frac{B_2}{\omega_2}}{A_1 - A_2} = G = Cr \quad (5)$$

Combining Eq. (5) with the first equation from Eqs. (4) leads to the resistivity of the gap r:

$$r = (A_1 - A_2) \bigg/ \left(\frac{1}{1 + (\omega_1 G)^2} \frac{1}{1 + (\omega_2 G)^2}\right) \quad (6)$$

Eq. (5) thus enables estimating capacitance C between receiver electrode and formation, while resistivity of the formation $R_f$ may be derived from the real parts of Eqs. (3):

$$R_f = A_1 - \frac{(\omega_1 C)^2 r}{r^2 + (\omega_1 C)^2} = A_2 - \frac{(\omega_2 C)^2 r}{r^2 + (\omega_2 C)^2} \quad (7)$$

Figure 14:
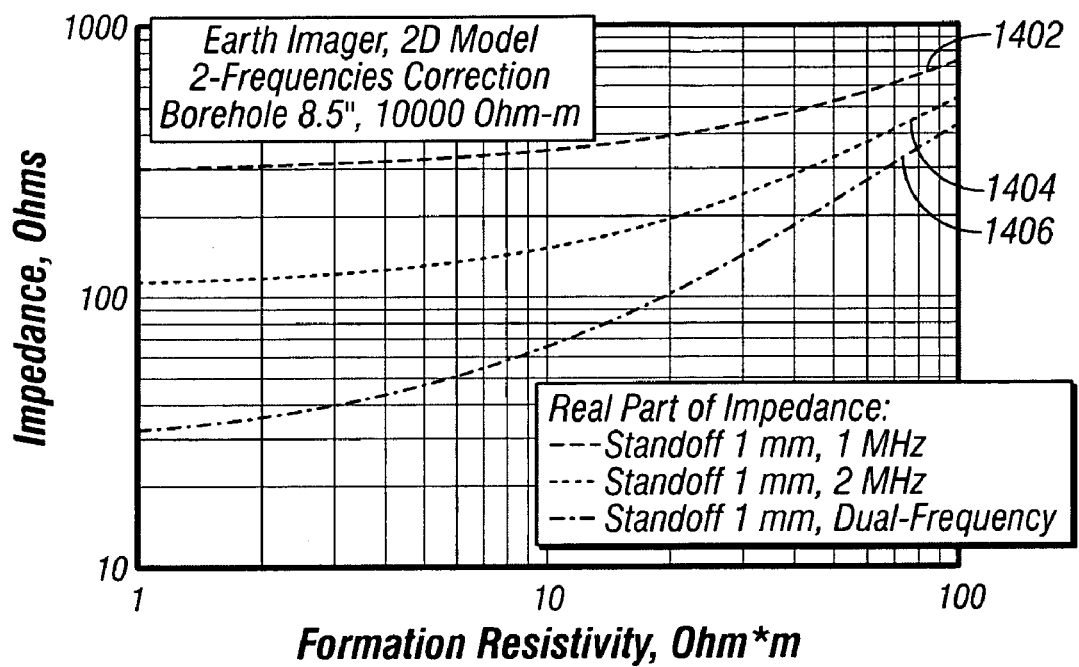
FIG. 14 shows mathematical modeling of an impedance of a formation model.

FIG. 14 shows mathematical modeling of the impedance for a formation model which includes a tool placed in a 8.5-inch diameter well filled with 10E+4 ohm-m resistive mud. The formation is modeled as a cylindrical layer with resistivity varying from 1 ohm-m to 100 ohm-m. The return electrode of the tool is modeled by a conductive cylinder of 10 m in length. Current is injected into the formation through a 1.6 cm long cylindrical electrode that has 1 mm standoff with respect to the formation. A transmitter provides an output voltage of 1V at frequencies of 1 MHz and 2 MHz.

The curves of FIG. 14 illustrate the effectiveness of the multi-frequency phase-sensitive measurements in obtaining formation resistivity. FIG. 14 shows the real part of the impedance for three cases: an impedance corresponding to frequency of 1 MHz (1402), an impedance corresponding to frequency of 2 MHz (1404) and dual frequency impedance (1406) calculated using Equations (3)-(7). The dual frequency impedance (1406) is more sensitive to the formation resistivity as compared to the single frequency impedances (1402, 1404).

Figure 15:
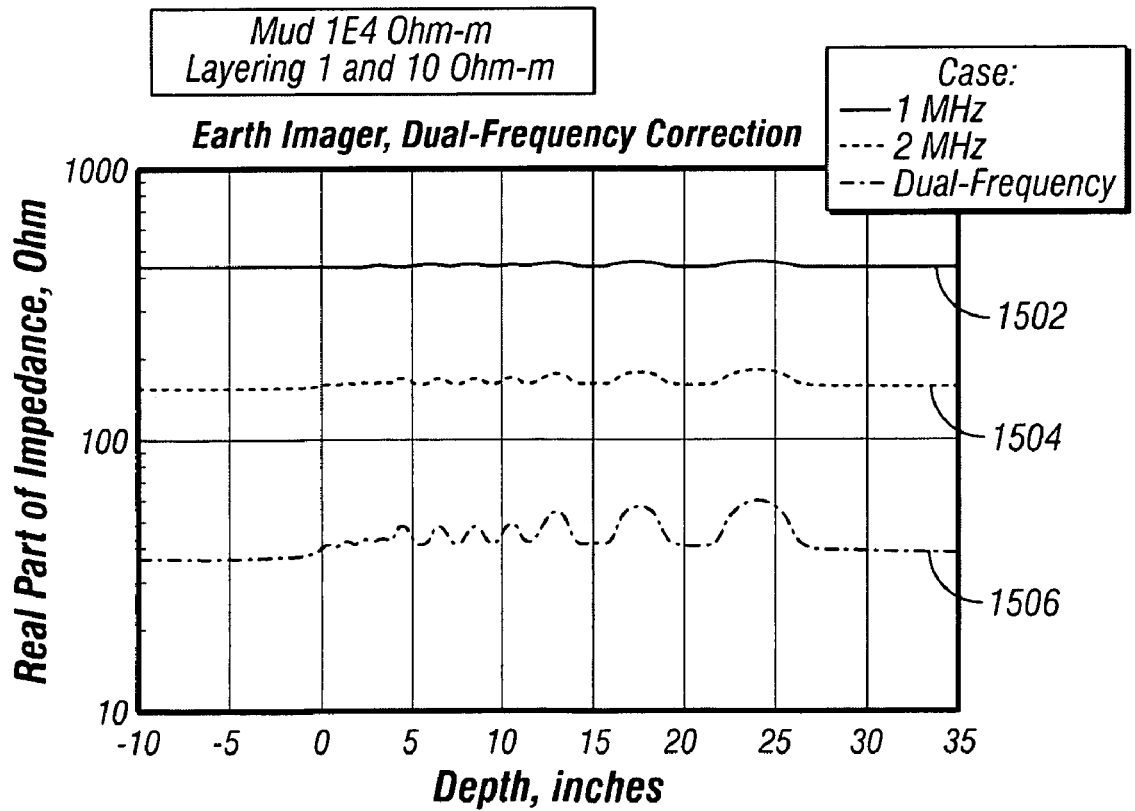
FIG. 15 presents mathematical modeling results in a formation which includes a sequence of resistive and conductive layers.

The advantage of using the dual frequency impedance is also observed in the case of a stratified formation model. FIG. 15 presents mathematical modeling results in the case of a formation which includes a sequence of resistive (10 ohm-m) and conductive (1 ohm-m) layers. FIG. 15 shows results corresponding to a frequency of 1 MHz (1502), results corresponding to a frequency of 2 MHz (1504) and results corresponding to dual frequencies (1506). The thickness of the layers varies from the left to the right between 0.5 inches to 4 inches. From this example, the dual frequency (1506) approach has improved resolution compared to the single frequencies measurements (1502, 1504).

For the purposes of this disclosure, a sensor electrode may be a current-measuring electrode or a voltage-measuring electrode generally usable for determining a resistivity measurement of a formation. Resistivity measurements may be obtained at least one of the first and second electrodes. The one or more resistivity measurements may be recorded to a suitable medium.

It is understood that the number of electrodes and electrode pairs shown in the figures of the present disclosure is chosen for illustrative purposes only. No limit is placed on the number, shape and size of electrodes on a given imaging device, and the number, shape and size shown in the figures is not meant as a limitation on the present disclosure.

The disclosure has further been described by reference to logging tools that are intended to be conveyed on a logging-while-drilling (MWD) tool. However, the method of the present disclosure may also be used with a wireline tool conveyed on a wireline. The BHA and the logging string conveyed on a wireline may be referred to as a downhole assembly.

The processing of the data may be done with the use of a computer program implemented on a suitable computer-readable medium which is accessible to circuitry and which enables the circuitry to perform the control and processing of the various methods of the present disclosure. In one aspect, the circuitry may be a processor. The term processor as used in this application is used in its traditionally-broad sense and is intended to include such devices as single-core computers, multiple-core computers, distributed computing systems, field programmable gate arrays (FPGAs) and the like. The computer-readable medium referenced in this disclosure is any medium that may be read by a machine and may include magnetic media, RAM, ROM, EPROM, EAROM, flash memory and optical disks. The processing may be done downhole or at the surface. In an alternative embodiment, part of the processing may be done downhole and parts of the processing may be done at a surface location.

While the foregoing disclosure is directed to the exemplary embodiments of the disclosure, various modifications will be apparent to those skilled in the art. It is intended that all variations within the scope and spirit of the appended claims be embraced by the foregoing disclosure.

What is claimed is:

1. An apparatus for obtaining a resistivity image of an earth formation, comprising:
   (a) a downhole assembly configured to be conveyed in a borehole penetrating the earth formation;
   (b) a plurality of measure electrodes on the downhole assembly, each of the plurality of electrodes having a different capacitance to a wall of the borehole, wherein a first one of the plurality of measure electrodes has a different extent in at least one of (I) a first direction substantially parallel to a longitudinal axis of the downhole assembly, and (II) a second direction substantially orthogonal to the longitudinal axis of the downhole assembly than an extent of a second of the plurality of measure electrodes in at least one of: (I) the first direction, and (II) the second direction; and
   (c) at least one processor configured to:
      process measurements made by each of the measure electrodes, including determining a first resistivity of the earth formation using one of (I) a current in the first measure electrode, or (II) a voltage of the first measure electrode, and determining a second resistivity of the earth formation using one of (I) a current in the second measure electrode, or (II) a voltage of the second measure electrode;
      and
      process a subset of the measurements substantially unaffected by the different capacitances to produce an image of the borehole wall.

2. The apparatus of claim 1 wherein the at least one processor is further configured to select the subset of the measurements by comparing a measurement made by an electrode to a measurement made by a reference electrode having a specified size.

3. The apparatus of claim 1, wherein the extent of the first measure electrode corresponds to a first resolution scale and the extent of the second measure electrode corresponds to a second resolution scale different from the first resolution scale.

4. The apparatus of claim 1 wherein the first measure electrode and the second measure electrode are selected from a first current electrode and a second current electrode.

5. The apparatus of claim 1, wherein the plurality of measure electrodes are arranged in a two-dimensional array.

6. The apparatus of claim 1, wherein at least one of the first one of the measure electrodes and the second one of the measure electrodes further comprises a grouping of more than one of the plurality of measure electrodes.

7. The apparatus of claim 6, wherein the more than one of the plurality of measure electrodes are grouped by one of: i) digital selection process, and ii) analog selection process.

8. A method of obtaining a resistivity image of an earth formation, comprising:
   conveying a downhole assembly in a borehole penetrating the earth formation, the downhole assembly comprising a plurality of measure electrodes each having a different capacitance to a wall of the borehole, wherein a first one of the plurality of measure electrodes has a different extent in at least one of (I) a first direction substantially parallel to a longitudinal axis of the downhole assembly, and (II) a second direction substantially orthogonal to the longitudinal axis of the downhole assembly than an extent of a second of the plurality of measure electrodes in at least one of: (I) the first direction, and (II) the second direction;
   processing measurements obtained using each of the measure electrodes, the processing including determining a first resistivity of the earth formation using one of (I) a current in the first electrode, or (II) a voltage of the first electrode, and determining a second resistivity of the earth formation using one of (I) a current in the second electrode, or (II) a voltage of the second electrode; and processing a subset of the measurements substantially unaffected by the different capacitances to produce an image of the borehole wall.

9. The method of claim 8 wherein selecting the subset of the measurements further comprises comparing a measurement made by an electrode to a measurement made by a reference electrode having a specified size.

10. The method of claim 8, wherein the extent of the first measure electrode corresponds to a first resolution scale and the extent of the second current electrode corresponds to a second resolution scale different from the first resolution scale.

11. The apparatus of claim 8 wherein the first measure electrode and the second measure electrode are selected from a first current electrode and a second current electrode.

12. The method of claim 8, further comprising a plurality of measure electrodes are arranged in a two-dimensional array.

13. The method of claim 8, further comprising grouping more than one of the plurality of measure electrodes to obtain at least one of the first electrode and the second measure electrode.

14. The method of claim 13, further comprising grouping the more than one of the plurality of measure electrodes by one of digitally and analogically.

15. A non-transitory computer-readable medium product having stored thereon instructions that when read by a processor cause the processor to execute a method, the method comprising:

processing measurements obtained using each of a plurality of measure electrodes having a different capacitance to a wall of a borehole in an earth formation, wherein a first one of the plurality of measure electrodes has a different extent in at least one of (I) a first direction substantially parallel to a longitudinal axis of the downhole assembly, and (II) a second direction substantially orthogonal to the longitudinal axis of the downhole assembly than an extent of a second of the plurality of measure electrodes in at least one of: (I) the first direction, and (II) the second direction, and further wherein the processing of the measurements includes determining a first resistivity of the earth formation estimated using one of: (I) a current in the first measure electrode and (II) a voltage of the first measure electrode, and determining a second resistivity of the earth formation estimated using one of: (I) a current in the second measure electrode and (II) a voltage of the second measure electrode; and producing an image of the wall of the borehole by processing a subset of the measurements substantially unaffected by the different capacitances.

16. The non-transitory computer-readable medium product of claim 15 further comprising at least one of (i) a ROM, (ii) an EPROM, (iii) an EEPROM, (iv) a flash memory, and (v) an optical disk.

\* \* \* \* \*